Patented May 18, 1954

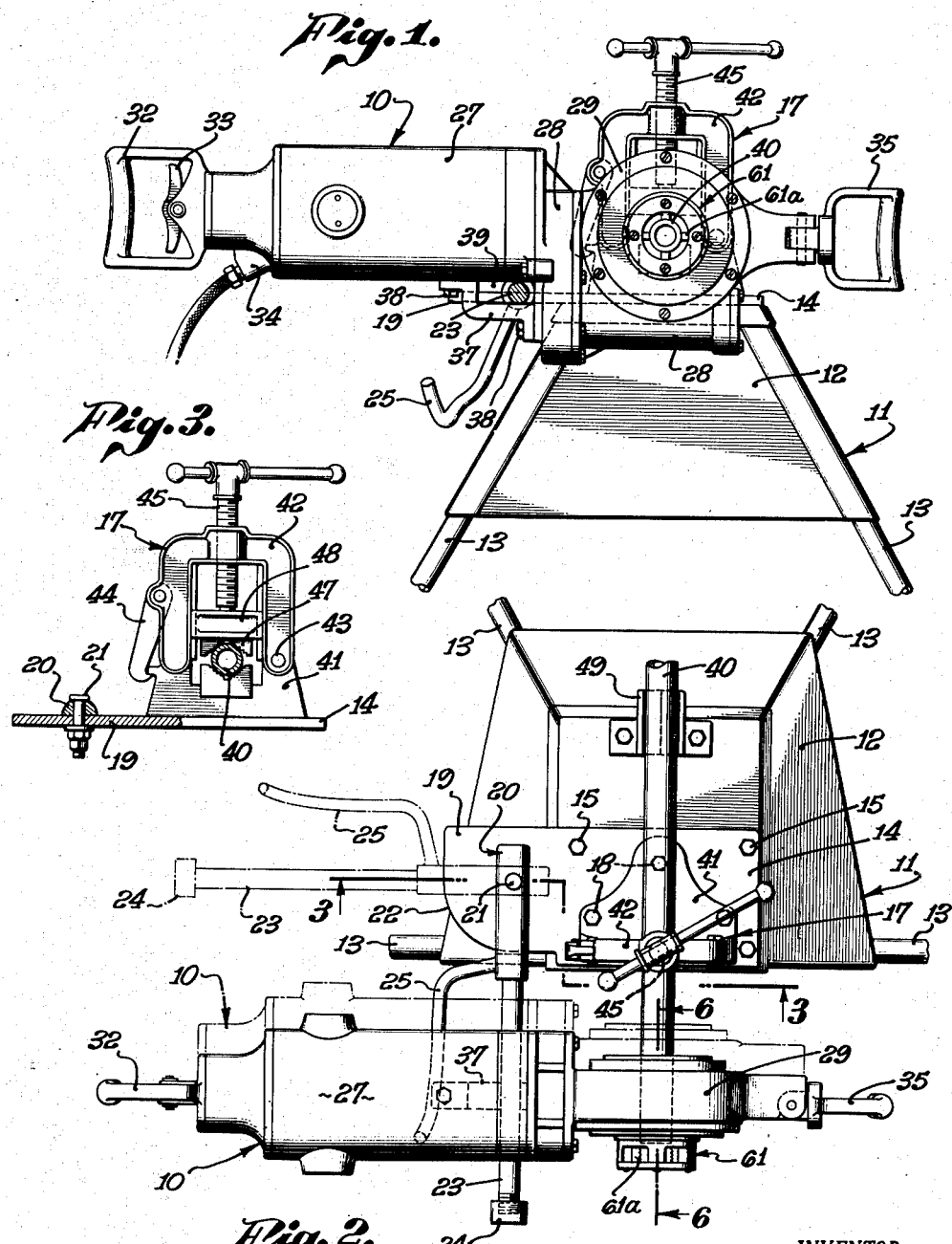

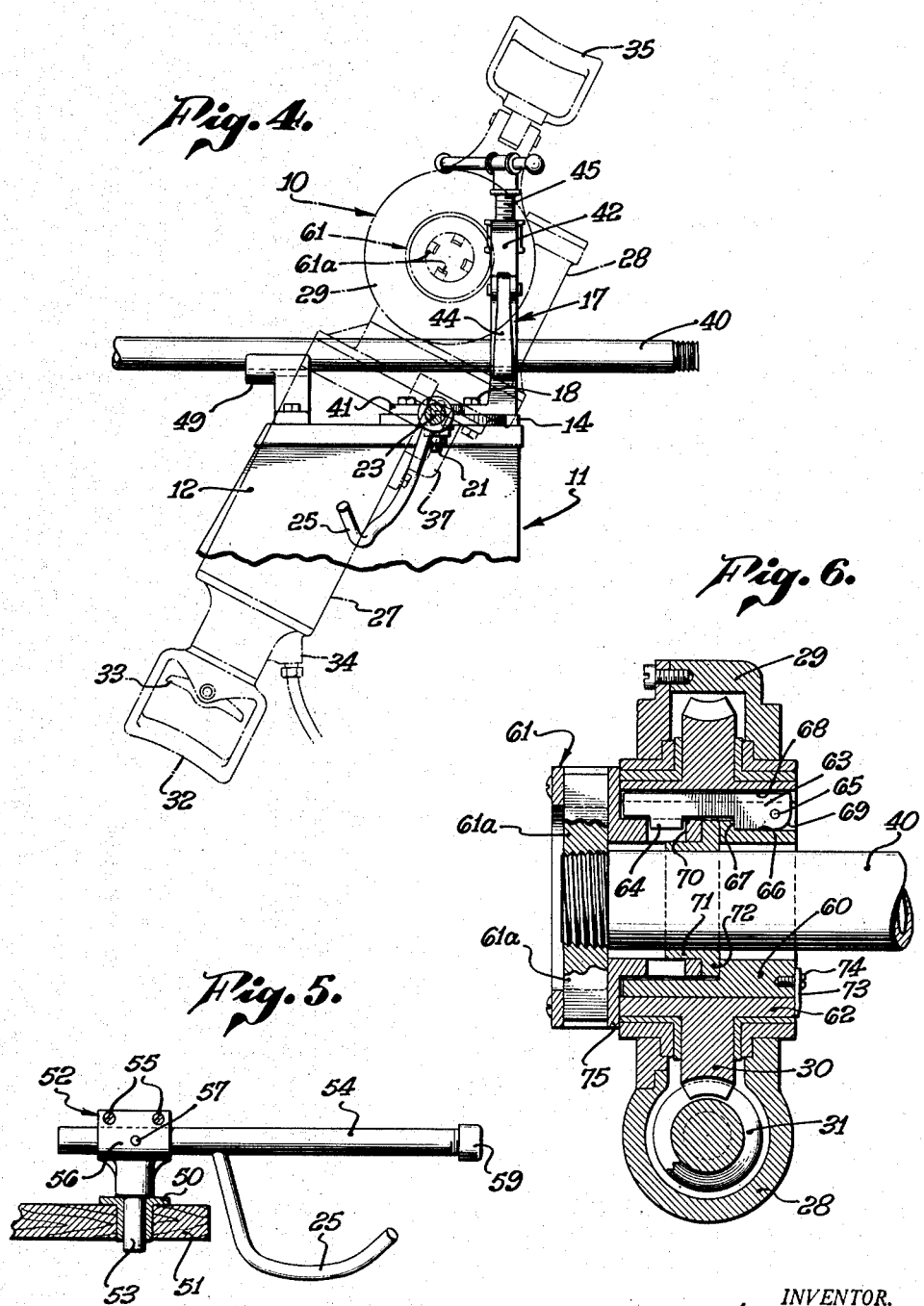

2,678,453

UNITED STATES PATENT OFFICE 2,678,453

SUPPORTING STRUCTURE FOR PORTABLE POWER TOOLS

George E. Rudolph, Los Angeles, Calif.

Application March 25, 1949, Serial No. 83,358

9 Claims. (Cl. 10—89)

This invention relates to power tools and supports therefor, and more particularly to a power driven pipe threading tool with novel die mounting features, and to a swinging mounting device for a pipe threading tool, which supports the entire weight thereof while at rest and in principal part during its manipulation and operation.

Power pipe threading tools are in widespread use wherever a substantial amount of pipe is to be threaded. One type of power pipe threader in general use by plumbers and steamfitters is a portable electrically energized device which is adapted to thread all standard sizes of iron pipe from about ⅛" to 2", American Standard. While these tools are termed "portable," and can be handled by one man, they weigh approximately sixty to one hundred pounds each. It is extremely tiring therefore even for a strong man to thread any considerable amount of pipe in a day with one of them if he has to carry the tool or support its weight during threading operations. Also, due to their very considerable weight, and the fact that they are built as light as practicable in view of the work they are required to perform, damage or breakage may be caused by improper or careless handling when the operator becomes tired or does not have the strength or skill necessary for their proper manipulation.

In power pipe threading tools it is customary practice to employ special threading die holders which usually are more expensive and complicated than those used in hand operated pipe stocks. Most shops having use for a power threader have on hand one or more of the conventional hand threading stocks, and an adequate supply of die holders therefor. It is a feature of the present invention to adapt a power pipe threader to use a standard ratchet type hand stock die holder.

A general object of the present invention is to make an improved support for power driven tools, as for example a portable power driven pipe threading tool.

Another object is to make a support for a power driven pipe threader mounted on a support for a cooperating pipe holding vise.

Another object is to make a support for a pipe vise and portable power driven pipe threading tool wherein the pipe threading tool and cooperating pipe vise are adapted for use either separately or conjointly, the support having means for cradling the threading tool when inoperative.

Another object is to make a pipe threader support adapted to swing into and out of threading relation to a pipe supported adjacent thereto.

Another object of the invention is to adapt the power driven head of a pipe threader for replaceable driving connection with a threading die holder for a common type of hand stock.

The above and other advantages of my invention are attained by providing a supporting structure for a threading tool, or the like, having a support arm on which the tool is movably mounted to support the weight of the tool, both while the tool is operated to cut threads or is inoperative. During the threading operation, the support arm extends substantially parallel to the length of pipe being threaded, and ordinarily both are horizontal, or nearly so. The arm is preferably pivotally mounted so that it can swing away from the operating position and carry the tool with it to a position clear of the pipe and the pipe gripping means when the tool is not in use. A cradle in the form of a downwardly extending curved bar is preferably attached to the arm to hold the tool in an inoperative position.

In a preferred form of my invention, the support arm is pivotally mounted on a base plate that also provides a space for mounting a vise used to grip the pipe during threading operations. The base plate can be attached to a stand or bench, as desired, and provides a simple means for keeping the vise and tool in fixed relation to each other so that the tool is supported within range of threading engagement with a pipe in the vise.

These and other features and advantages of the invention are set forth in the following description and the accompanying drawings, comprising two sheets. In the drawings:

Fig. 1 is a front elevational view of a usual type of work stand, lower portions of the legs thereof being broken away, a pipe threader support, with a pipe vise being bolted in position on the stand, a pipe threading tool being shown in pipe threading position on the support;

Fig. 2 is a plan view of the apparatus shown in Fig. 1, alternate positions of a tool support and of a threading tool being shown in dot-dash lines;

Fig. 3 is a fragmentary sectional view taken in the offset planes of the broken line 3—3 of Fig. 2, the work stand being omitted;

Fig. 4 is a fragmentary side elevational view of the apparatus shown in Figs. 1 and 2, a pipe threading tool support being shown as it appears when swung sideways to an inoperative position, the pipe threading tool being shown in dot-dash lines in the position it occupies when resting by gravity in inoperative condition on a cradle forming part of the threading tool support;

Fig. 5 is a side elevational view of a modified form of threading tool support, a pivot structure being shown sectionally; and Fig. 6 is a longitudinal median sectional view through the head of the pipe threading tool, on line 6—6 of Fig. 2.

In the drawings, and referring first to the embodiment of the invention illustrated in Figs. 1 to 4 inclusive, a power driven pipe threading tool is indicated generally at 10. The tool is not described in detail since my invention is not, in its broader aspects, limited to any particular type of tool. A work stand 11 also is of a usual type, and comprises a sheet metal upper portion 12 with tubular legs 13 inserted telescopically in sockets provided one in each corner of the upper portion 12.

A rigid planiform mounting plate 14 may be of half-inch steel plate and is secured as by bolts 15 to the top surface of the work support. A usual type of pipe vise 17 is secured to the plate 14 as by bolts 18. The plate 14 has a laterally extending portion 19 which projects outwardly beyond the left-hand side of the top of the work stand as illustrated in Figs. 1 and 2.

An arm 20 is pivoted on bolt 21 on the laterally extending portion of the plate 14. The inner end of the arm 20 is preferably cut away to approximately one-half its diameter, as shown in Fig. 3, the flat side thereof being in contact with the upper surface of the plate 14, in order to reduce the tendency of the arm to turn when the tool is in rest position, as will be more fully understood from later description. The forward corner portion 22 of the plate 14 may be cut away on a circular segment, the center of which is the axis of the pivot bolt 21. The axis of bolt 21 is ordinarily vertical, or substantially so.

The outer end portion 23 of the support arm is of reduced diameter and extends outwardly a sufficient distance to permit axial slidable movement thereon of the threading tool 10 during a pipe threading operation, as from the solid to the dot-dash line positions of Fig. 2. At the inner end of the reduced diameter portion of the support arm, the increase in diameter forms a shoulder that acts as a stop to limit movement of the tool inwardly along the arm.

A retaining cap 24, of larger diameter than the reduced outer end portion 23 of the arm 20, is threaded onto the outer end of the shaft where it acts as a stop to limit the outward sliding movement of the threading tool thereon. The threading tool may be removed from the support arm however upon unscrewing the cap 24 from the shaft.

A cradle bar 25 is secured, as by welding, toward the inner end portion of the arm 20. This cradle bar initially extends downwardly and outwardly from the point of its connection to arm 20, and then ends in a curve as illustrated so that the threading tool will tend to center itself on the curved section when resting by its own weight thereon.

The pipe threading tool 10 may be of generally conventional construction and comprises a motor casing portion 27 in which a usual reversible driving motor is mounted. A gear section 28 is secured to an end of the motor casing, and a threading head housing 29 is in turn secured to the opposite end of the gear section from the motor casing. In the threading head housing a worm gear 30 (see Fig. 6) is in driven engagement with a worm drive pinion 31.

A spade grip handle member 32 is mounted to extend outwardly beyond the motor casing, and has a tilting motor control reversing switch 33 therein. A conductor connector 34 is mounted beneath the handle support to receive a usual type of rubber covered electrical conductor cord. A second spade grip handle 35 is mounted on the opposite end of the threading tool from the handle 32.

A mounting bracket 37 is mounted on the underside of the threading tool 10 to define an elongated opening 39 of a size to receive with loose sliding fit the reduced outer end portion 23 of arm 20 for pivotal and limited sliding movement thereon. The bracket is secured in position by bolts 38. The bracket is located, relative to the center of gravity of the threading tool, so that the tool swings counterclockwise (viewed in Fig. 1) about arm 20 when released by an operator, and rests by gravity on the cradle bar 25 as illustrated in dot-dash lines in Fig. 4. To insure this off-balance movement of the tool, at least a portion of the elongated opening 39 in bracket 37 extends to the right of a vertical line through the center of gravity of the tool when in the working position of Fig. 1; and the opening 39 may extend, if desired, under the center of gravity. The particular shape illustrated of this mounting bracket is not essential to the invention, and may be varied to fit the housings of different types of pipe threaders with which the present support may be used.

The pipe vise 17 mounted on the plate 14 may be of any suitable type for holding a pipe 40 gripped therein in position to permit the rotative axis of the threading dies of the threading tool 10 to center thereon. The vise illustrated has a usual base 41 with V-type serrated lower jaws. An upper yoke portion 42 is pivoted on one side at 43 to the base, and is secured by a locking latch 44 to the other side of the base. A vise screw 45 is threaded through the top of the yoke to manipulate an inverted V-shaped upper jaw 47 which is mounted upon a slidable cross head 48.

A V-shaped pipe support 49, see Fig. 4, is mounted on the top of the work stand 11 in longitudinal alignment with the V-shaped lower jaws of the pipe vise.

In the modified form of tool support illustrated in Fig. 5, the construction is essentially the same as described above except that no mounting plate is provided as in the form illustrated in Figs. 1 to 4 inclusive. In this form of Fig. 5 a bushing 50 is adapted to be inserted in a hole drilled in a bench top 51, or in the end of a post fastened to the floor, or in any other suitable fixture holding the support adjacent a vise. The bench top or the like ordinarily provides the area for mounting vise 17 or other means for holding pipe in place while being threaded so that the bench top itself holds the pivot 50 and the vise in fixed spaced relation to each other. Except for the change in the pivotal mounting for arms 20 and 54, the tool support shown in Fig. 5 operates just the same as the form of my invention first described.

A pivoted clamping member 52 has its lower end portion 53 pivoted in the bushing 50. The upper portion 56 of this member 52 is adapted to clamp about a tool support arm 54. Screws 55 are provided to tighten the clamping portion closely about the support arm.

A pin 57 is adapted to pass through aligned holes through the clamping portion 56 and arm 54 to secure the shaft against turning movement about its axis under torque applied by the unbalanced weight of the threading tool when resting on cradle 25. The cradle is similar in shape and use to that described for the form of the invention illustrated in Figs. 1 to 4 inclusive, and may be welded or otherwise secured to arm 54.

An enlarged retaining cap 59 similar to that previously described for the illustration of Figs. 1 to 4 is threaded onto the outer end of the support arm 54 to prevent the threading tool from sliding off the support except when this cap is removed.

An adapter 60, illustrated in Fig. 6, is provided to permit the use of an ordinary, ratchet, hand stock type of threading die holder 61 in a power pipe threading tool. Holder 61 has four threading dies 61a of conventional design. The adapter 60 comprises a cylindrical sleeve which is insertable endwise in the cylindrical bore of the hub portion 62 of the worm gear 30. A key 63, having an inwardly extending lug 64 thereon, is pivotally mounted on a pin 65 in a keyway 66 cut lengthwise in the periphery of the adapter 60. The key projects radially outward beyond the periphery of the adapter 60 and is adapted to slide longitudinally into keyway 68 in the bore of the hub 62 when the adapter is inserted in the hub. The inner end of the key adjacent its pivot is rounded as at 69 to permit the key to swing outwardly about its pivot when the adapter is withdrawn from the hub.

The lug 64 is held in interlocking engagement with any one of the usual ratchet holes 70 in the die holder 61 when the assembly is inserted in the hub, to cause the die holder to rotate with adapter 60 and gear 30, but may be released by swinging the key outwardly about its pivot when the adapter is withdrawn from the hub. The key 63 has an offset notch 67 in a side thereof which fits into a corresponding notch in the keyway in the adapter to absorb endwise stresses on the key, and thus relieve the pivot pin 65 from such stresses.

A pipe guiding sleeve 71, having an inner opening of a size to receive a pipe 40 to be threaded, has a radially projecting flange portion 72 which is adapted to fit in the space between a shoulder in the adapter and the inner end of the die holder 61.

A latch plate 73 is secured to the right-hand end of the adapter 60 as illustrated in Fig. 6 by a screw 74. The latch plate extends radially outwardly to overlie the right-hand end of the hub of the worm gear 30, and thereby restrain the adapter against left-hand axial movement relative to the hub. The adapter is prevented from reverse or right-hand axial movement in the hub by the usual radially projecting flange 75 of the die holder.

Operation

The support for the pipe threader or similar tool preferably will be supplied in the form of a kit, with the necessary instructions for mounting. The kit for the form of the invention shown in Figs. 1 to 4 inclusive preferably includes the mounting plate 14, elongated support arm 20, with cradle 25, cap 24, pivot pin 21, and mounting bracket 37. The plate 14 preferably will be supplied with holes drilled therein for receiving the mounting bolts 18, and for the pivot bolt 21. Holes for receiving the vise mounting bolts however can be drilled by the purchaser in a suitable area of plate 14 to match those in the particular type of pipe vise which he may desire to use with the support.

The mounting bracket 37, to fit the particular type of pipe threading tool employed, is mounted beneath the threading tool, preferably in the longitudinally offset relation to the center of gravity of the tool described above so that the tool tends to tilt, by gravity, toward the cradle when released by the operator.

The pipe vise 17 is mounted on the plate 14 so that a pipe secured therein has its axis within reach of die holder 61. In operation, these two axes coincide. It is a function of plate 14 to locate the axis of a pipe held in the vise 17 at a fixed location, or within the range of threading engagement with the tool, relative to the tool support so that an operator has no set up to make. He merely places the pipe in the vise, and knows it is properly positioned to be engaged by the threading dies.

To mount the threading tool on the support, the retaining cap 24 is removed from the end of the arm 20 and the tool slid onto arm 20 by inserting the arm into opening 39, as illustrated in Fig. 1, and the cap replaced. When not in use the threading tool is permitted to drop down by its own weight to rest on cradle 25. The support arm 20 may be swung on its pivot approximately 90° to the dotted line position of Figs. 2 and 4 to move the pipe threading tool 10 entirely clear of the vise. The tool is still supported, but is entirely clear of the vise so that it does not interfere with its use for other operations.

To thread a pipe 40 mounted in the vise 17, the pipe is adjusted with its end projecting outwardly beyond the vise a required distance as illustrated in Fig. 2, and is clamped in adjusted position in the vise. The length of pipe is usually substantially horizontal and is so shown in the drawings. The threading tool and its support are then swung bodily in a counterclockwise direction about the pivot 21 from the dot-dash line to the solid line position of Fig. 2, in which support arm 20 is substantially parallel to the pipe gripped in vise 17. Next, the operator grasps handles 32 and 35 and rotates the tool to the generally horizontal position of Fig. 1. The threading tool can then be moved inwardly on the arm 20, and also pivotally or transversely relative to the axis of the support arm as may be required to bring the end of pipe 40 into the pipe guide 71, as illustrated in Fig. 6.

The threading tool is next moved inward, axially of the pipe, until the threading dies rest against the outer end of the pipe. The driving motor is then energized by the control switch 33, and the dies cut the thread on the pipe. During the threading operation the tool moves axially along arm 20, from the solid line position to the dot-dash position of Fig. 2. When the pipe has been threaded to a required length the driving motor is reversed by switch 33 to unscrew the dies from the thread. The tool is then drawn outwardly to clear the end of the pipe, and may be permitted to swing down onto its cradle.

To change the threading dies and their holder 61 and the pipe guide 71, the latch plate 73 is released by releasing the screw 74, whereupon the adapter 60 and its assembled pipe guide 71 and die holder 61 may be withdrawn from the hub endwise to the left from the position of Fig. 6. Upon removal of this assembly from the hub 62 the key 63 is swung outwardly in a clockwise direction from the position illustrated in Fig. 6. This withdraws the laterally projecting lug 64 from the hole in the die holder 61, permitting the die holder to be withdrawn axially from the adapter. This in turn releases the pipe guide 71 for removal to the left, whereupon another die holder with dies for the required size of pipe and matching pipe guide 71 may be inserted in the adapter and the key 63 again swung inwardly into a ratchet hole in the die holder. The entire assembly then may be replaced in the hub and again secured in position by the latch plate 73.

The device comprises a simple and inexpensive arrangement which greatly facilitates and extends the field of usefulness of portable power driven pipe threaders. The support is rugged, it is easily transportable, and its manner of use is readily comprehended even by an inexperienced apprentice. When mounted on the present support, a power driven pipe threader can be operated for long periods by even unskilled or less powerful operators without undue tiring, while damage to the threading tool is greatly reduced by use of the present invention.

The novel die holder adapter also permits the use of die holders with which presently practicing plumbers are familiar and customarily have on hand, thereby reducing the initial cost of adopting a power threading tool.

While I have illustrated and described a preferred embodiment of my invention and a principal modification thereof, it will be apparent to those familiar with the art that the device is capable of various modifications without departing from the spirit and scope of the invention. It is desired therefore not to limit the invention except as set forth in the following claims.

I claim:

1. A supporting structure for a portable power driven pipe threader or the like adapted to be mounted adjacent a vise for gripping a pipe to be threaded, comprising: a horizontally extending support arm of substantially uniform cross section for at least part of its length; arm engaging means adapted to mount a power driven pipe threader tool on the arm, said arm engaging means including a bracket attachable to the pipe threader and having a section spaced from the body of the pipe threader to form an elongated opening through which the arm passes to mount the pipe threader for pivotal and limited lengthwise and transverse movement relative to the arm, said support arm being mounted to support the pipe threader within range of threading engagement with a pipe gripped in the vise; and a curved cradle attached to the support arm and extending generally downwardly therefrom to hold the threader against further pivotal movement when moved to an inoperative position.

2. A supporting structure for a portable power driven pipe threader or the like adapted to be mounted adjacent a vise for gripping a pipe to be threaded in a substantially horizontal position, said support comprising: an elongated horizontal support arm, means mounting the arm to swing about a substantially vertical axis, and arm engaging means interconnecting the support arm to a power driven pipe threader, said arm engaging means including a bracket attachable to the pipe threader and having a section spaced from the body of the pipe threader to form an elongated opening through which the arm passes to mount the pipe threader for sliding movement of said threader on said support element, said support element being mounted to bring the pipe threader into range of threading engagement with a pipe gripped in the vise.

3. A supporting structure for a portable power driven pipe threader, or the like, comprising: a work stand having a vise for gripping a pipe to be threaded, mounted thereon; a base element disposed laterally of said vise; a support arm pivoted on said base element; and a mounting bracket attached to a power driven pipe-threader mounting the threader on the arm for relative pivotal and limited longitudinal and transverse movement on said support arm, said mounting bracket having a section spaced from and generally parallel to the body of the pipe threader to form an elongated opening through which the support arm passes, the pivoted support arm being mounted to swing said pipe threader into and out of axial threading alignment with a pipe gripped in said vise.

4. A supporting structure for a portable power driven pipe threader or the like, comprising: a work stand having a vise for gripping a pipe to be threaded, mounted thereon; a base element interposed between the vise and the work stand and extending laterally beyond said vise; a support arm pivoted on the laterally extending portion of said base element; a removable stop member mounted at one end of said arm; a curved cradle rod secured to said support arm and pivotally movable therewith; and a mounting bracket attached to a power driven pipe-threader mounting the threader on the arm for relative pivotal and limited longitudinal and transverse movement on said arm, said mounting bracket having a section spaced from and generally parallel to the body of the pipe threader to form an elongated opening through which the support arm passes, the pivoted support arm being mounted to swing said pipe threader into and out of axial threading alignment with a pipe gripped in said vise, and the cradle rod underlying the threading tool to provide cradling support therefor upon pivotally moving said tool to an inoperative position.

5. A supporting structure for a portable power driven pipe threader or the like, comprising: a work stand having a vise for gripping a pipe to be threaded mounted thereon; a horizontal base plate mounted to extend laterally beyond said vise; a forward corner portion of the base plate being cut away on a circular curve; an elongated tool support pivoted on said base element concentrically with the circular curve of said rounded corner portion; a lower portion of the support overlying said rounded corner portion being flattened to have supporting engagement with the upper surface of said rounded corner portion; and a mounting bracket attached to a power driven pipe-threader mounting the threader on the arm for pivotal and limited longitudinal and transverse movement on said support, said mounting bracket having a section spaced from and generally parallel to the body of the pipe threader to form an elongated opening through which the support arm passes, the pivoted support being mounted to swing said pipe threader into and out of axial threading alignment with a pipe gripped in said vise.

6. A portable power threading tool support structure comprising a plate adapted to be mounted on a work stand and to have a vise mounted thereon, said plate having a rounded side portion; an elongated support element pivoted on the plate to swing in a plane parallel thereto, and concentrically with the rounded plate side portion, said support element having a slide mounting portion thereon, said element having a removable outer end portion comprising a stop; and a retaining bracket adapted to be secured to a portable power threading tool to form with the body of the tool an elongated opening through which the support element passes loosely and to have underlying retaining engagement with said support element during pivotal and limited lengthwise and transverse sliding movement of said tool on said support.

7. A supporting structure for a power threading tool or the like comprising a bushing adapted to mount on a work stand, a pivot rotatably mounted in said bushing; clamp means carried by said bushing, and having aligned transverse holes therethrough; an elongated support member support member adapted to be clamped in said clamp means and having a hole therethrough in alignment with the holes in said clamp means, said support member having a shaft portion extending beyond said clamp means; a pin mounted in said aligned holes to secure said support to said clamp means; an enlarged head on the end of said shaft portion remote from said clamp means; a bracket adapted to be secured beneath a portable power threading tool and around said shaft portion to form, with a bottom portion of the threading tool, an elongated enclosure to secure the threading tool for pivotal and limited lateral and endwise sliding movement on the shaft portion; and a cradle support secured to said support adjacent said clamp means and curved with a concavely curved portion thereof extending below and at one side of the shaft portion to receive the threading tool for cradle support therein.

8. A supporting and guiding structure for a hand manipulated, power-driven pipe-threader or the like used in conjunction with a fixed work piece, comprising: a fixed base; a support arm pivoted near one end to the base and having a straight section of substantially uniform circular cross section; and a mounting bracket for attachment to a pipe-threader to define an opening through which the straight section of the support arm passes, said opening having one dimension substantially equal to the diameter of the arm section and being relatively elongated in a direction perpendicular to said one dimension.

9. A supporting and guiding structure as in claim 8 in which the mounting bracket is of angular configuration and is adapted for detachable connection to the threading tool, said bracket defining only a portion of the periphery of the elongated opening but cooperating with the pipe-threader to define the entire periphery of the opening.

References Cited in the file of this patent

UNITED STATES PATENTS

| Number | Name | Date |
|---|---|---|
| 418,637 | Barrett | Dec. 31, 1889 |
| 920,797 | Werner | May 4, 1909 |
| 1,194,813 | Brown | Aug. 15, 1916 |
| 1,329,651 | Carmody | Feb. 3, 1920 |
| 1,420,847 | Konigsberg | Feb. 27, 1922 |
| 1,858,850 | Borden | May 17, 1932 |
| 1,966,124 | Kimlin | July 10, 1934 |
| 2,191,191 | Pealer | Feb. 20, 1940 |
| 2,205,148 | Mayotte | June 18, 1940 |